UNITED STATES PATENT OFFICE.

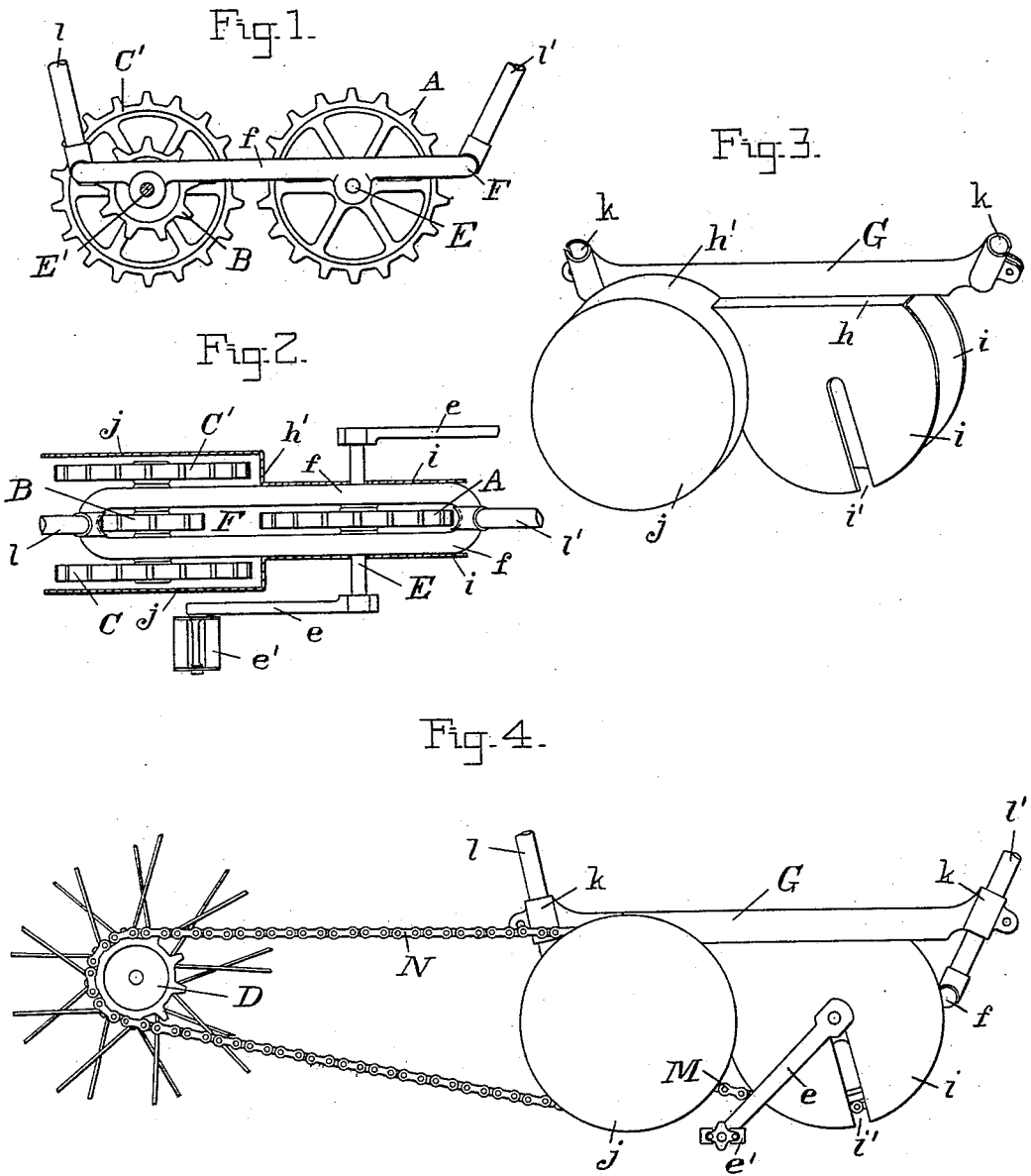

HEZEKIAH J. THOMPSON, OF NASSAU, BAHAMA ISLANDS.

BICYCLE.

SPECIFICATION forming part of Letters Patent No. 569,394, dated October 13, 1896.

Application filed January 8, 1896. Serial No. 574,776. (No model.)

*To all whom it may concern:*

Be it known that I, HEZEKIAH JAMES THOMPSON, a subject of the Queen of Great Britain, residing at Nassau, in the island of New Providence, one of the Bahama Islands, have invented certain new and useful Improvements in Bicycles, of which the following is a specification.

My invention relates to improvements in bicycles, and has for its object to provide a special construction of speed-gearing and an improved casing or shield therefor which protects the clothes of a rider from injury.

The invention is illustrated in the accompanying drawings, in which—

Figure 1 is a side view of a portion of a bicycle-frame provided with my gearing, except the rear chain and rear sprocket. Fig. 2 is a top or plan view of the same, but showing the pedal cranks and shaft, and also showing the shield or casing in horizontal section. Fig. 3 is a perspective view of the gear casing or shield. Fig. 5 is a side view showing a portion of the frame and rear wheel and my improvements applied thereto.

Referring to the drawings, the letter A designates a main or crank sprocket mounted between the parallel bars $f$ of an oblong link-shaped part F of the bicycle-frame on a crank-axle E, which has bearing in said bars and projects beyond the same at each end. To these projecting ends the pedal-cranks $e$ and pedals $e'$ are attached, as usual. An auxiliary shaft E' also has bearing in the two bars $f$ in rear of the said crank-axle and carries a small center sprocket B, which is smaller than the crank-sprocket. A short chain M connects the crank and center sprockets A and B. On the projecting ends of the auxiliary shaft E' are two auxiliary sprocket-gears C C', and a chain N may connect either one of these auxiliary gears with the small sprocket D on the rear wheel of the bicycle. By this construction of gearing to each revolution of the crank-sprocket A the center sprocket B and the two auxiliary sprocket-gears C C' will make two revolutions, and as these auxiliary gears are larger than the rear sprocket D the latter will be caused to make four revolutions to each revolution of the said crank-sprocket.

I have provided a special shield or casing to cover the gearing and serve also as a pants or dress protector. This comprises a straight central horizontal plate G, which covers the top of wheel A. Each end of this plate G has a half-circular-shaped clip K, which takes about the upward-projecting bars $l\ l'$ of the bicycle-frame, and are secured thereto by bolts or by other suitable means. This central plate also has flat lateral surfaces $h$, one at each side, and two front downward-projecting part-circular-shaped plates $i$, each provided with a radial slot $i'$, opening at the lower edge. These two plates are open at the front and bottom and take astride of the bars $f$ and wheel A, the radial slots fitting down over the crank-axle E. The center plate also has part-cylindric side walls $h'$, which are wider than the lateral surfaces $h$, and to these walls are attached downward-projecting circular plates $j$, which take on the outer side of the two sprocket-wheels C C' and cover said wheels and the center sprocket B. It will be seen that this shield or casing is particularly designed for my gearing and completely incloses the sprockets and chains thereof adjacent the pedals and serves to protect the pants or dress of the rider.

Having thus described my invention, I claim—

1. In a bicycle, the combination of the bars of the bicycle-frame; a crank-axle carrying a sprocket; and a shield or casing comprising the central horizontal plate having at each end a clip, $k$, to engage the bars of the bicycle-frame, and provided with downward circular-shaped plates which take astride of the crank-sprocket and each plate provided with a radial slot fitting down over the crank-axle, as set forth.

2. In a bicycle, the combination of the bars of the bicycle-frame; a crank-axle carrying a sprocket; the auxiliary shaft carrying on its ends two auxiliary side sprockets; and a shield or casing comprising the central horizontal plate having at each end a clip, $k$, to engage the bars of the bicycle-frame, and provided with downward circular-shaped plates, $i$, which take astride of the said crank-sprocket and each of said plates provided with a radial slot fitting down over the crankaxle, and said central plate also provided with a surface at each side and downward-projecting circular plates, *j*, which are wider apart than the first-named circular-shaped plates and take on opposite sides of and cover the said two auxiliary sprockets.

In testimony whereof I affix my signature in the presence of two witnesses.

HEZEKIAH J. THOMPSON.

Witnesses:
E. W. McPHERSON,
E. D. MURPHY.